US009672986B2

(12) United States Patent
Koller et al.

(10) Patent No.: US 9,672,986 B2
(45) Date of Patent: Jun. 6, 2017

(54) ACOUSTIC NOISE CANCELLATION IN MULTI-LAYER CAPACITORS

(71) Applicant: Apple Inc., Cupertino, CA (US)

(72) Inventors: Jeffrey G Koller, San Jose, CA (US); P Jeffrey Ungar, Belmont, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 14/476,250

(22) Filed: Sep. 3, 2014

(65) Prior Publication Data

US 2015/0200056 A1 Jul. 16, 2015

Related U.S. Application Data

(60) Provisional application No. 61/926,506, filed on Jan. 13, 2014.

(51) Int. Cl.
*H01G 4/35* (2006.01)
*H01G 4/30* (2006.01)
(Continued)

(52) U.S. Cl.
CPC ............... *H01G 4/30* (2013.01); *G05F 1/10* (2013.01); *H01G 4/012* (2013.01); *H01G 4/12* (2013.01);
(Continued)

(58) Field of Classification Search
CPC .. H01G 4/30; H01G 4/35; H01G 4/12; H01G 4/38; H01G 4/012; H01G 4/40; H02M 3/04; H02M 1/12; G05F 1/10
(Continued)

(56) References Cited

U.S. PATENT DOCUMENTS 5,250,915 A 10/1993 Ikeda
6,920,316 B2 * 7/2005 Connell ................. G05F 1/56
455/180.1

(Continued)

FOREIGN PATENT DOCUMENTS

EP 1480236 4/2004
JP 2004193352 7/2004
(Continued)

OTHER PUBLICATIONS

Attached English translation of Publication No. JP 2013-258278 A or Patent No. JP 5974653.*

(Continued)

*Primary Examiner* — Jue Zhang
*Assistant Examiner* — Htet Z Kyaw
(74) *Attorney, Agent, or Firm* — Meyertons, Hood, Kivlin, Kowert & Goetzel, P.C.

(57) ABSTRACT

A device is presented for decoupling voltage transients occurring on a voltage signal generated by a voltage regulator. The device may decouple the voltage transients from circuits coupled to the voltage regulator. The device may include two capacitors that may be contained in a single package. The two capacitors may be coupled to the voltage signal from the voltage regulator such that one capacitor is also coupled to a ground reference and the other capacitor is also coupled to a supply voltage. The capacitors may be constructed in a multi-layer ceramic capacitor (MLCC) process. The materials that form the MLCC may be arranged such that the MLCC package does not change shape or vibrate in response to voltage level fluctuations on the voltage signal.

20 Claims, 9 Drawing Sheets

(51) Int. Cl.
    *H02M 3/04* (2006.01)
    *H01G 4/38* (2006.01)
    *H01G 4/40* (2006.01)
    *H01G 4/012* (2006.01)
    *H01G 4/12* (2006.01)
    *G05F 1/10* (2006.01)
    *H02M 1/12* (2006.01)

(52) U.S. Cl.
    CPC ............... *H01G 4/35* (2013.01); *H01G 4/38* (2013.01); *H01G 4/40* (2013.01); *H02M 1/12* (2013.01); *H02M 3/04* (2013.01)

(58) Field of Classification Search
    USPC ........................................ 323/304; 361/301.4
    See application file for complete search history.

(56) References Cited

U.S. PATENT DOCUMENTS

| | | | |
|---|---|---|---|
| 7,277,270 B2 | 10/2007 | Sato et al. | |
| 7,414,459 B2 * | 8/2008 | Pisasale | G11O 5/147 307/109 |
| 7,804,678 B2 | 9/2010 | Wu | |
| 8,107,214 B2 * | 1/2012 | Aoki | H01G 4/012 361/303 |
| 8,351,180 B1 | 1/2013 | Ahn et al. | |
| 8,804,367 B2 | 8/2014 | Park et al. | |
| 2007/0297244 A1 * | 12/2007 | Wu | G11C 16/0475 365/185.28 |
| 2008/0084651 A1 * | 4/2008 | Oguni | H01G 4/30 361/303 |
| 2008/0144201 A1 * | 6/2008 | Koc | G02B 7/021 359/824 |
| 2009/0244807 A1 | 10/2009 | Lee | |
| 2013/0329388 A1 | 12/2013 | Dogauchi | |
| 2015/0325376 A1 * | 11/2015 | Fujii | H02M 3/07 323/304 |
| 2015/0364254 A1 * | 12/2015 | Ritter | H01G 4/30 174/260 |

FOREIGN PATENT DOCUMENTS

| | | | |
|---|---|---|---|
| JP | 2008021980 | | 1/2008 |
| JP | 2008205135 | | 9/2008 |
| JP | 2013-258278 | A * | 12/2013 |
| JP | 5974653 | | 8/2016 |

OTHER PUBLICATIONS

Written Opinion in application No. PCT/US2014/072978 mailed Apr. 8, 2015.
Search Report in application No. PCT/US2014/072978 mailed Apr. 8, 2015.
International Preliminary Report on Patentability in application No. PCT/US2014/72978 issued Jul. 28, 2016.
Office Action in ROC (Taiwan) Patent Application No. 104101109 issued Apr. 27, 2016. This document is missing.

* cited by examiner

ACOUSTIC NOISE CANCELLATION IN MULTI-LAYER CAPACITORS

PRIORITY CLAIM

This application claims the benefit of U.S. Provisional Patent Application No. 61/926,506, filed on Jan. 13, 2014, and whose disclosure is incorporated herein by reference.

BACKGROUND

Technical Field

The embodiments described herein are related to the field of capacitor design, and more particularly to the implementation of capacitors used for minimizing voltage transients.

Description of the Related Art

In electronic circuits, complex components like microprocessors or Systems-on-a-Chip (SoCs) have fluctuating power demands, so capacitors are placed near these devices to hold supply voltages steady as current demand changes. These so-called "decoupling" or "bypass" capacitors are connected between power and ground and act as local low-impedance voltage sources, able to handle transient currents occurring as the load fluctuates. Capacitors manufactured from aluminum or tantalum electrolytics are one choice for decoupling, due to their low cost and large capacitance. In addition, in some embodiments, the voltage levels of supply voltages utilizing these capacitors are held relatively constant during operation, making electrolytic capacitors a suitable choice.

Demand for smaller portable devices drives miniaturization requirements to demand smaller components. Electrolytic capacitors may not provide the best option as they may not provide the smallest capacitor solution. Additionally, power reduction techniques to improve battery life have led to systems that adjust their supply voltages depending on the level of activity of the devices. Modern portable devices may often subject decoupling capacitors to voltages that step dynamically between multiple levels, such as, for example, 0.8V and 1.8V, at time intervals that may be on the order of milliseconds. Again, electrolytic capacitors may not provide the best option as they may not respond to changing voltage levels as quickly as required. Alternatively, advances in ceramic technology have led to Multi-Layer Ceramic Capacitors (MLCCs) suitable for use as decoupling capacitors that may provide physically small components and that allow for faster changes in voltage levels.

However, the combination of MLCC technology and dynamic supply voltages may create an issue. MLCCs use ceramic dielectric materials (e.g., barium titanate) that may change shape slightly when electric fields across the conductive plates of such capacitors change. These shape changes may result from a variety of physical phenomena including the piezoelectric effect, electrostriction, and Coulomb force, and may cause MLCCs to mechanically vibrate in response to a changing voltage level across terminals of such a capacitor. This vibration may couple through capacitor mounting points to excite mechanical vibrations in a circuit board, which may then cause devices to emit audible noise if voltage level changes occur at a frequency in the audible range.

This audible characteristic of MLCCs (commonly referred to as "capacitor singing") was first observed in MLCC applications involving AC signal filtering, and may be a cause of a noise emanating from an electronic device. Measurements and calculations show that the physical displacements in the capacitor may be extremely small, such that the capacitor surface moves, perhaps, only a fraction of the width of a single atom. Due to large forces that may be involved, the total mechanical power coupled into the system may, however, be macroscopic and audible to humans. Techniques may, therefore, be needed to reduce or eliminate a characteristic such as this. One approach may be to modify the capacitor mounts to reduce the coupling between the MLCC and the circuit board. Another approach may be to arrange multiple capacitors such that most noise is coupled into non-audible resonance modes of the circuit board. However, both techniques may be hampered by the fact that the physical causes of the vibration are diverse and poorly understood, and that the details of the capacitor shape change are influenced by its internal design and vendor processing details, thereby making mass production of such solutions difficult.

A device is desired which may suitably decouple voltage transients on a supply voltage from circuits dependent upon the supply voltage. The desired device should also be of a small form factor for use in portable devices and be resistant to the capacitor singing characteristic just described. Systems and methods for a low-noise capacitive device are presented below.

SUMMARY OF THE EMBODIMENTS

Various embodiments of a capacitor are disclosed. Broadly speaking, an device, a system and a method are contemplated in which the device includes a first set of conductive plates coupled to a first node in a common package, a second set of conductive plates coupled to a second node in the common package, and a third set of conductive plates coupled to a third node in the common package. A conductive plate of the first set of conductive plates may be arranged between a conductive plate of the second set of conductive plates and a conductive plate of the third set of conductive plates.

In a further embodiment, another conductive plate of the first set of conductive plates may be arranged between two or more conductive plates of the second set of conductive plates, and a third conductive plate of the first set of conductive plates may be arranged between two or more conductive plates of the third set of conductive plates. In one embodiment, a conductive plate of the second set of conductive plates may be arranged adjacent to a conductive plate of the third set of conductive plates.

In another embodiment, a space between a conductive plate of the first set of conductive plates and a conductive plate of the second set of conductive plates may include a dielectric material, and a space between a conductive plate of the first set of conductive plates and a conductive plate of the third set of conductive plates may include the dielectric material. In additional embodiments, the dielectric material may consist of a ceramic material. In some embodiments, the dielectric material may be configured to shrink in response to a reduction of a voltage level and expand in response to an increase in a voltage level change. In other embodiments, the dielectric material may be configured to shrink in response to an increase in a voltage level change and expand in response to a reduction of a voltage level change.

BRIEF DESCRIPTION OF THE DRAWINGS

The following detailed description makes reference to the accompanying drawings, which are now briefly described.

FIGS. 3(A), 3(B), and 3(C), illustrates a perpendicular stress on a multi-layer capacitor at several voltage potentials.

FIGS. 5(A), 5(B), and 5(C), illustrates a perpendicular stress on a multi-layer capacitive network at several voltage potentials.

FIGS. 6(A), 6(B), and 6(C), illustrates a parallel stress on a multi-layer capacitor at several voltage potentials.

FIGS. 7(A), 7(B), and 7(C), illustrates a parallel stress on a multi-layer capacitive network at several voltage potentials.

Figure 1:
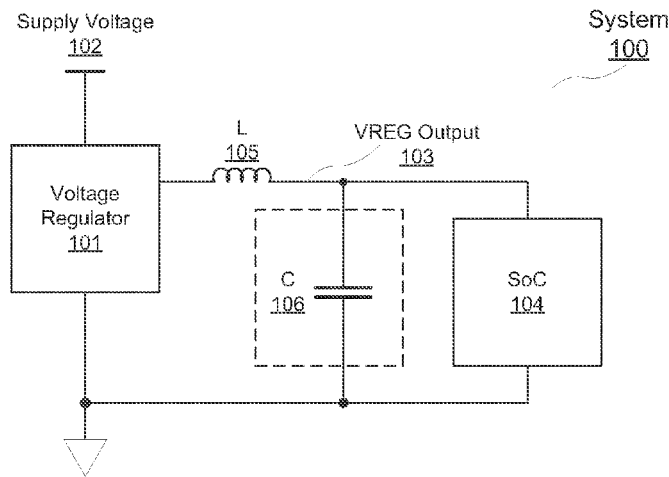
FIG. 1 illustrates a block diagram of an embodiment of a circuit including a voltage regulator and an SoC.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112 (f) interpretation for that unit/circuit/component. More generally, the recitation of any element is expressly intended not to invoke 35 U.S.C. §112 (f) interpretation for that element unless the language "means for" or "step for" is specifically recited.

DETAILED DESCRIPTION OF EMBODIMENTS

As portable devices are designed into smaller packaging and more functionality is included in their designs, the need for components used in these designs to be physically smaller is continuously increasing. For example, capacitors may be used in portable devices for a variety of reasons. Capacitors may be, for example employed to help stabilize voltage levels (also referred to as "decoupling" or "bypassing") subjected to transient current demands. To achieve necessary form factors, some manufacturers may use a ceramic technology such as, for example, Multi-Layer Ceramic Capacitors (MLCC), to manufacture such decoupling capacitors.

MLCCs may exhibit a characteristic which may be known as "capacitor singing." Capacitor singing refers to a characteristic in which an MLCC may mechanically vibrate in response to a changing voltage level across the capacitor due to a reaction of a dielectric material within the MLCC.

To reduce the effects of capacitor singing in a decoupling circuit, a solution is disclosed herein including a proposed decoupling circuit and a proposed capacitor design. A solution may be to interleave electrodes that form the capacitor in the MLCC appropriately, such that shape changes in one region may be compensated by equal but opposite shape changes in another region. As a result, the capacitor as a whole may experience little to no overall shape change, and energy that may have been emitted as acoustic noise may stay within the capacitor and dissipate as a negligible amount of heat. A potential advantage of this approach is that it does not depend on understanding the causes of the shape change, and may continue to work even if the material properties differ throughout mass production or drift as the MLCC ages. Details of such a solution are presented below.

Regulated System Overview

In FIG. 1, a block diagram of an embodiment of a system including a voltage regulator and an SoC is presented. In the illustrated embodiment, system 100 includes voltage regulator 101 coupled to a supply voltage 102. VREG output 103 may be the output generated by voltage regulator 101 and which may be provided to SoC 104. In some embodiments, the coupling between voltage regulator 101 and SoC 104 may include parasitic inductance L105. Capacitor C106 may be included in an embodiment of system 100.

Voltage regulator 101 may receive a first voltage level as an input, such as supply voltage 102, and produce VREG output 103 with a second voltage level. In some embodiments, the first voltage level may be higher than the second voltage level. In other embodiments, the second voltage level may be higher than the first voltage level. Voltage regulator 101 may be any suitable regulator design with various characteristics, such as, for example, switched or linear, buck or boost, and AC-to-DC or DC-to-DC.

Supply voltage 102 may provide power to system 100 and more specifically, to voltage regulator 101. Supply voltage 102 may be a DC power source, such as, e.g., a battery, or an AC power source such as, e.g., from a wall socket. In some embodiments, supply voltage 102 may be the output of another voltage regulator or a voltage rectifier, such as, e.g., the output of a battery charger. The voltage level of supply voltage 102 may be at a different value than is suitable for SoC 104 and therefore may require regulation by voltage regulator 101 to a suitable voltage level.

VREG output 103 may be the power source for SoC 104. VREG output 103 may, in some embodiments, remain at a steady nominal voltage level, for example, fixed at 1.8V. In other embodiments, however, VREG output may have a programmable nominal voltage level that may be set by SoC 104 or by another processor in the system. In such embodiments, the voltage level of VREG output 103 may be adjusted as needed to supply SoC 104 with a voltage level to match the activity level of SoC 104.

SoC 104 may include a processor, memory, and any number of functional blocks. In various embodiments, SoC 104 may be a microprocessor, Application-Specific Integrated Circuit (ASIC), a Field-Programmable Gate Array (FPGA), or any other circuit that may place a variable load on voltage regulator 101. SoC 104 may be a main processor in a portable computing device such as a smart phone, tablet or media player. In other embodiments, SoC 104 may be a coprocessor, designed to perform a specific task or related tasks such as graphics processing, audio processing, or wireless communication. SoC 104 may operate at one nominal voltage level or may operate at multiple voltage levels, depending on tasks currently being performed. In some embodiments, SoC 104 may enter and exit power saving modes, reducing power consumption when activity is low and increasing power consumption to perform one or more tasks quickly. The changes in activity level may be rapid, occurring, for example, multiple times a second. SoC 104 may be coupled to voltage regulator 101 to set a target voltage level for VREG output. In other embodiments, another processor in the system may set the voltage level for VREG output and instruct SoC 104 to perform in accordance with VREG output.

Some embodiments may include a parasitic inductance L105. Inductance L105 may, in various embodiments, represent the self-inductance of a wiring trace on a circuit board upon which system 100 is built. That is, inductance L105 may be an undesired effect of other design choices in the system rather than a discrete component. In other embodiments, inductance L105 may be a part of the design of voltage regulator 101. Since a voltage drop across an inductor is proportional to the time rate of change of current through the inductor, inductance L105 may cause the voltage level of VREG output 103 to drop or rise in response to a sudden change in power demand, such as, for example, if SoC 104 suddenly exits or enters a power saving mode.

To compensate for changes in the voltage level of VREG output 103 due to inductance L105 or other factors that may induce voltage instability in VREG output 103, some embodiments may include capacitor C106. Since capacitors store charge and resist sudden voltage changes, C106 may use the stored charge to supply a sudden current demand, such as if SoC 104, for example, exits a power saving mode and suddenly starts consuming more power, thereby maintaining a more consistent voltage level on VREG output 103. C106 may supply charge in response to a sudden increase in power demand by SoC 104, while voltage regulator 101 stabilizes to the new power consumption level. Conversely, if there is a sudden decrease in power consumption due to, for example, SoC 104 entering a power saving mode, C106 may absorb the extra charge until voltage regulator 101 stabilizes to the new power consumption level.

The block diagram of FIG. 1 is merely an example. System 100 in FIG. 1 shows only the components necessary for demonstration of the embodiments herein. In other embodiments, system 100 may include various other components not shown in FIG. 1.

Figure 2:
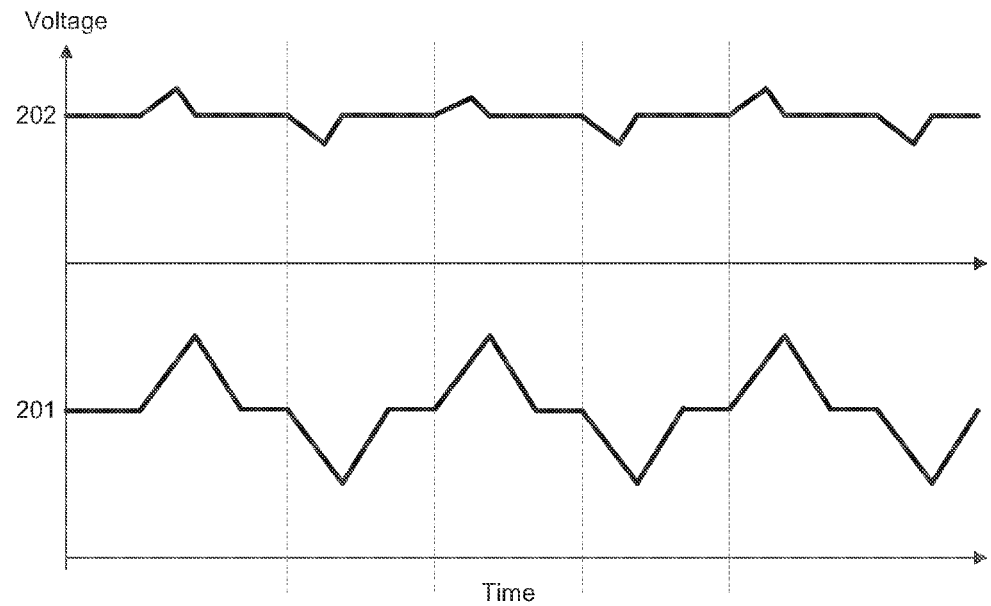
FIG. 2 illustrates possible waveforms of a circuit including a voltage regulator and an SoC.

The effect of capacitor C106 may be illustrated in FIG. 2. FIG. 2 illustrates possible waveforms which may represent the voltage level of VREG output 103 versus time, during operation of system 100. Referring collectively to system 100 in FIG. 1 and the waveforms of FIG. 2, waveform 201 may represent the voltage level of VREG output 103 in an embodiment of system 100 that does not include a capacitor such as C106, for example. Conversely, waveform 202 may represent the voltage level of VREG output 103 in an embodiment of system 100 with an included capacitor.

Waveform 201 may illustrate the impact of sudden changes in current demand upon voltage regulator 101 without a capacitor coupled between VREG output 103 and ground. Waveform 201 shows large peaks and valleys in the voltage level in response to changes in current demand, occurring at points indicated by the dashed lines. The upward peaks may be caused by a sudden drop in current consumption by SoC 104 due to a sudden decrease in activity by SoC 104. The parasitic effects that cause inductance L105 may prevent voltage regulator 101 from reacting quickly to the sudden drop in current consumption, resulting in a buildup of charge on VREG output 103 which in turn may cause the temporary voltage increase since this charge may have no place to go. As voltage regulator 101 is able to stabilize to the new level of current consumption, the voltage peak may fall back to the nominal voltage level for VREG output 103.

At alternate points to the peaks, waveform 201 also illustrates large valleys in VREG output 103. The downward valleys may be caused by a sudden increase in SoC 104 activity. Again, if voltage regulator 101 has been stable, parasitic inductance L105 may resist changes in current flow from regulator 101. As a result, insufficient current may flow into SoC 104 to meet the sudden increase in current demand. As a result of the current deficiency, the voltage level of VREG output 103 may fall until voltage regulator 101 is able to overcome the effects of inductance L105 and adjust to the new current demand. As voltage regulator 101 stabilizes, the voltage level of VREG output 103 may rise back to the nominal voltage level Waveform 202, in contrast, may illustrate the effect of adding capacitor C106 between VREG output 103 and ground in system 100. Waveform 202 shows much smaller peaks and valleys in response to the changes in current demand at the indicated points. Additionally, the duration of the peaks and valleys may be shorter with C106 included compared to when C106 is excluded. If current demand suddenly decreases, the accumulated charge that had nowhere to go in the example of waveform 201, may flow to C106, which may result in only a modest rise in the voltage level of VREG output 103. If current demand suddenly decreases, then the opposite may occur and charge stored in C106 may flow temporarily to SoC 104 until voltage regulator 101 stabilizes.

The waveforms of FIG. 2 are examples representing one possible embodiment. The waveforms illustrated in FIG. 2 are merely to demonstrate the concepts associated with the embodiment of FIG. 1. Actual waveforms related to system 100 may vary based on circuit design, components used, technology used, and environmental conditions in which system 100 is operating, among other factors.

Multi-Layer Ceramic Capacitors

Figure 3:
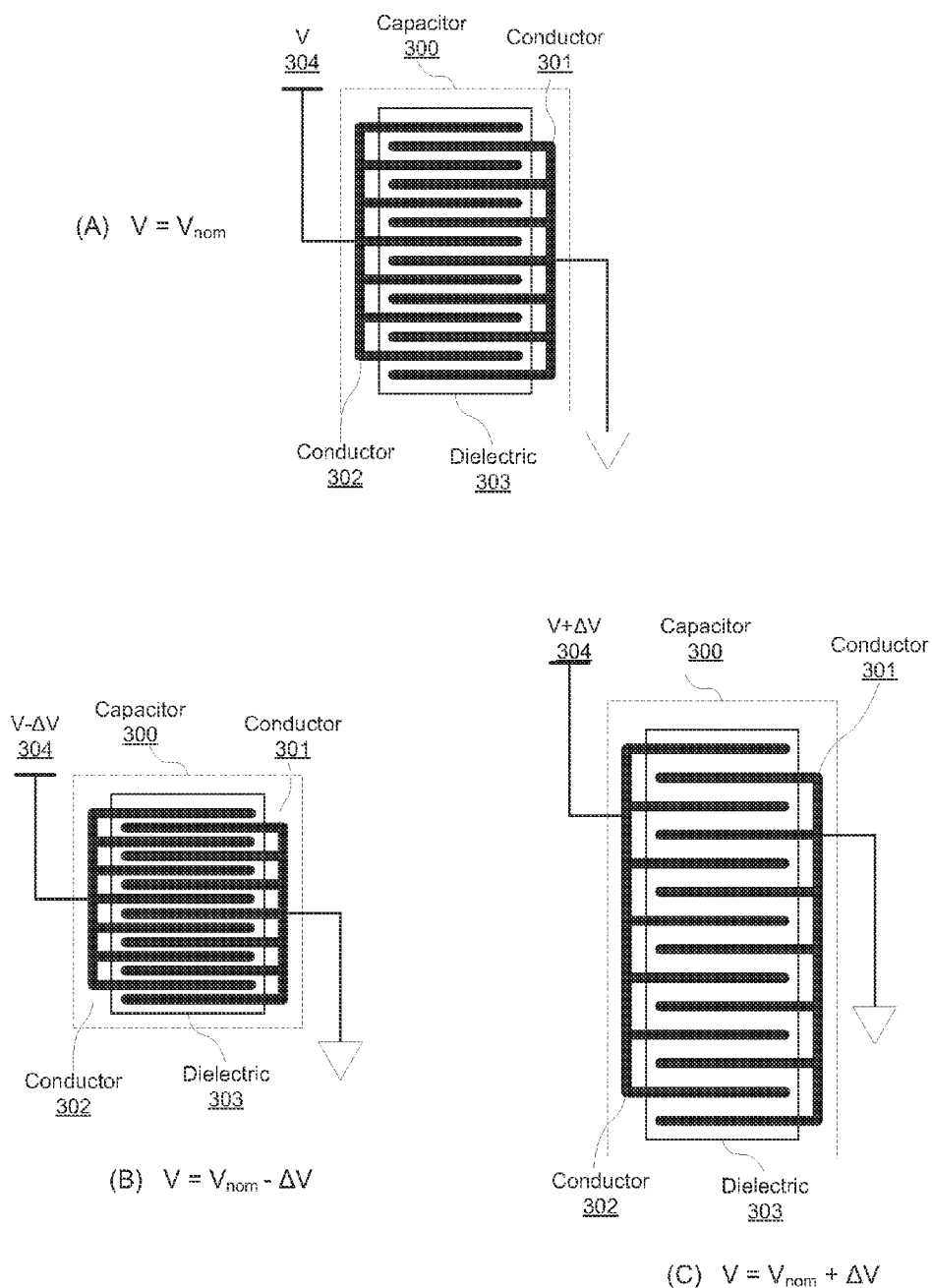
FIG. 3, which includes

As mentioned above, ceramic capacitors, and MLCCs in particular, are suitable choices for use as decoupling capacitors such as, for example, C106 in FIG. 1. Turning to FIG. 3, which includes FIGS. 3(A), 3(B), and 3(C), a representation of an MLCC is illustrated (A) under a stable, nominal voltage level, (B) under a sudden negative shift in voltage level, and (C) under a sudden positive voltage shift. Capacitor 300 includes conductor 301, coupled to ground, and conductor 302 coupled to voltage source 304. Conductor 301 and conductor 302 are isolated from each other by dielectric 303.

Conductor 301 and conductor 302 may include multiple layers of metal, separated by dielectric 303. The layers constituting conductor 301 may be coupled to each other on one end of capacitor 300 and the layers constituting conductor 302 may be coupled to each other on the opposite end, although other configurations are possible. The metal layers (also referred to as plates) may be interspersed such that the layers alternate between conductor 301 and conductor 302. Conductor 301 and conductor 302 are shown with seven plates each for ease of illustration. The actual number of plates may be over 1000, in some embodiments, and the total number of plates may be one factor to determine the capacitance value of capacitor 300.

Dielectric 303 may be created from a non-conductive material such as, for example, a ceramic material (e.g., barium titanate or titanium dioxide). To adjust some of the capacitor's characteristics, the material may include additives such as, for example, aluminum silicate or magnesium silicate for use with barium titanate, and zinc or zirconium for use with titanium dioxide. In other embodiments, other suitable substances may be used as dielectric 303. The dielectric may be a reasonably uniform thickness between the plates of conductor 301 and conductor 302 when the voltage level of voltage (V) 304 is stable, i.e., not changing due to changes in current demand as described above. FIG. 3(A) shows capacitor 300 at the nominal operating voltage.

If the voltage level of voltage (V−ΔV) 304 drops by a value of ΔV as shown in FIG. 3(B), dielectric 303 may shrink, reducing the thickness of each layer of dielectric 303 between a plate of conductor 301 and conductor 302. In other embodiments, dielectric 303 may expand in response to a negative shift in the voltage level. If capacitor 300 has hundreds or more layers of plates, the cumulative effect may be a noticeable shift in the total size of the capacitor and may shift the center of mass of capacitor 300, which may result in the physical force of the shift being transferred to a circuit board on which capacitor 300 may be attached.

If the voltage level of voltage (V+ΔV) 304 increases by a value of ΔV from the nominal voltage level as shown in FIG. 3(C), then the opposite effect may occur and dielectric 303 may expand, shifting the center of mass of capacitor 300 in the opposite direction from when the dielectric shrinks. In other embodiments, dielectric 303 may shrink in response to a negative shift in the voltage level. Referring to FIG. 1, if C106 corresponds to an MLCC such as capacitor 300, and SoC 104 is operating such that a periodic increase and decrease in power consumption is generated, the periodic power consumption changes may create voltage shifts between conductor 301 and conductor 302 resulting in capacitor 300 vibrating at a frequency inversely proportionate to the period of the power consumption changes. This vibration may transfer to the circuit board, and, if the frequency is in an audible range, a humming or other noise may be heard. Even if the frequency is outside of the audible range, the resulting vibration may stress the attachment points of capacitor 300 to the circuit board and may contribute to a physical failure of the circuit if the attachment points were to break.

It is noted that the illustrations of FIG. 3 are for demonstrative purposes only. The illustrations have been simplified and exaggerated to emphasize the effects of voltage transitions on the shape of an MLCC. In addition, the number of plates shown for each conductor may be far greater in an actual MLCC.

Figure 4:
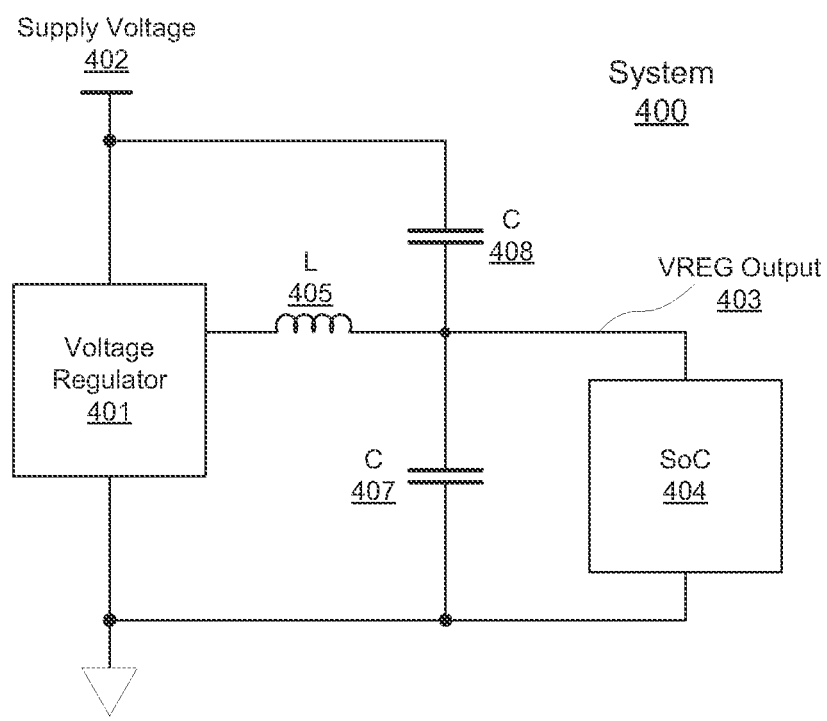
FIG. 4 illustrates another embodiment of a circuit including a voltage regulator and an SoC.

Moving now to FIG. 4, a block diagram of another embodiment of a system including a voltage regulator and an SoC is presented. In the illustrated embodiment, system 400 includes voltage regulator 401 coupled to a supply voltage 402. VREG output 403 is the output generated by voltage regulator 401, which may be provided to SoC 404. In some embodiments, the coupling between voltage regulator 401 and SoC 404 may include parasitic inductance L405. Inductance L405 may be caused by the leads of voltage regulator 401 or by the conductive traces on a circuit board of system 400. Capacitor C407 may decouple VREG output 403 with respect to ground and capacitor C408 may decouple VREG output 403 with respect to supply voltage 402.

Voltage regulator 401, supply voltage 402, VREG output 403, SoC 404 and inductance L405 may all be similar to voltage regulator 101, supply voltage 102, VREG output 103, SoC 104 and inductance L105, respectively, from FIG. 1, and may therefore behave as described above in reference to FIG. 1. System 400 may include capacitor C408 between VREG output 403 and supply voltage 402. In order to provide an equivalent level of decoupling when compared to C106 in FIG. 1, the capacitance values of C407 and C408 together may add up to the capacitance value of C106. In this manner, an equivalent amount of charge may be stored in C407 and C408 as is stored in C106.

Referring back to the waveforms of FIG. 2, an upwards spike on the voltage level of VREG output 403 may create a positive ΔV on C407. However, this upwards spike may have the opposite impact on C408, creating an equal, but negative ΔV since C408 is coupled to supply voltage 402 instead of ground. A downwards spike on the voltage level of VREG output 403, similarly, may create a negative ΔV on C407 and an equal, but opposite ΔV on C408. This equal, but opposite, characteristic may be used to mitigate the morphing effect demonstrated by the dielectric material in MLCCs.

The block diagram of FIG. 4 has been simplified for demonstrating the concepts discussed above. System 400 in FIG. 4 shows only the components necessary for demonstration of the embodiments herein. In other embodiments, system 400 may include various other components not shown in FIG. 4.

Figure 5:
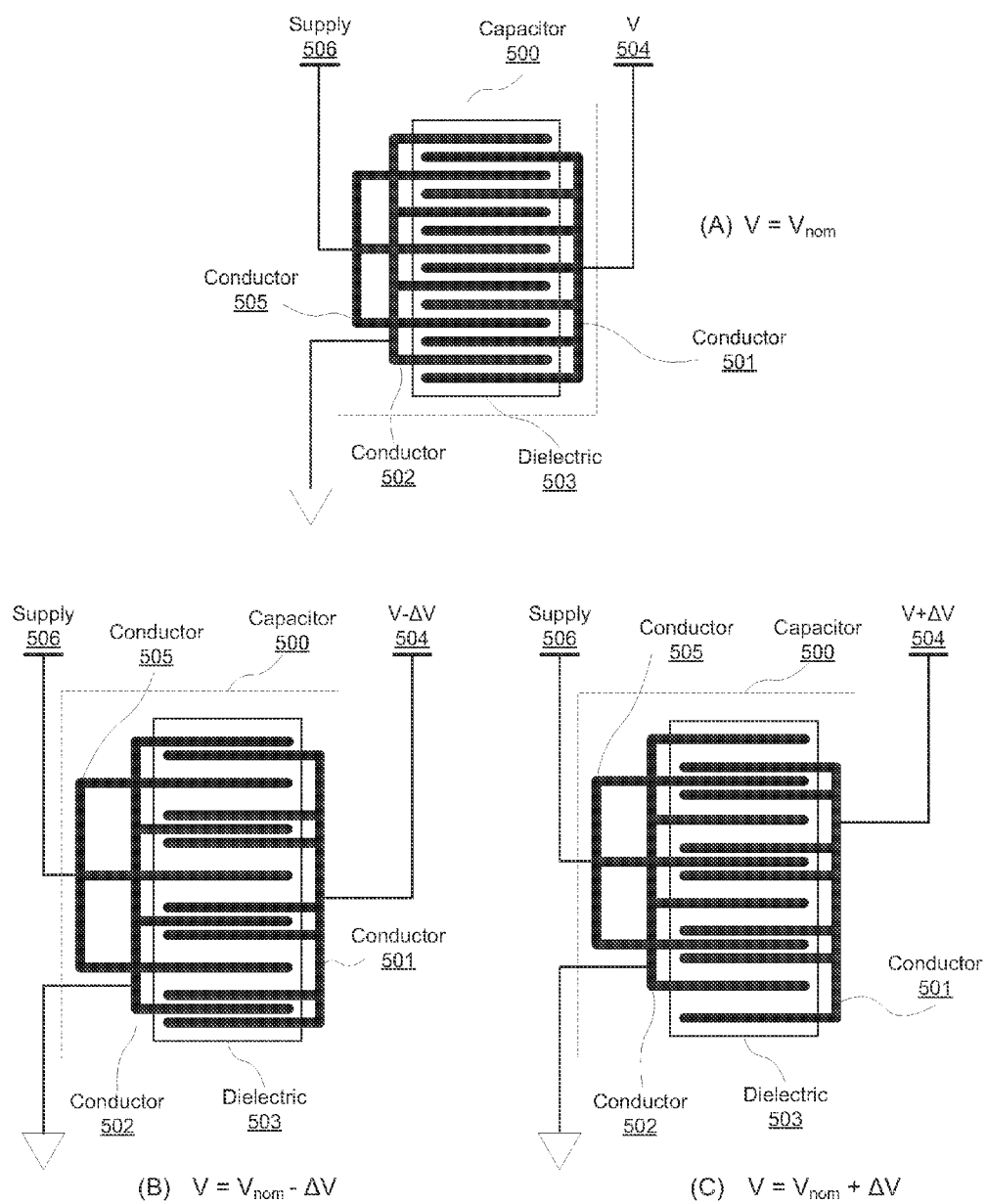
FIG. 5, which includes

Turning to FIG. 5, which includes FIGS. 5(A), 5(B), and 5(C), another embodiment of a MLCC is illustrated. FIG. 5 includes three illustrations showing capacitor 500 (A) under a nominal voltage level, (B) under a sudden negative shift in voltage level, and (C) under a sudden positive voltage shift. Capacitor 500 includes conductor 501, coupled to voltage (V) 504, and conductor 502 coupled to ground. Conductor 501 and conductor 502 are isolated from each other by dielectric 503. Capacitor 500 also includes conductor 505 coupled to supply voltage (Supply) 506.

Capacitor 500 may include two capacitors with a single shared conductor and two individual conductors. A first capacitor may be created by the arrangement of conductor 501 and conductor 502. This capacitor may correspond to C407 in FIG. 4. A second capacitor may be formed by the arrangement of conductor 501 and conductor 505 and may correspond to C408 in FIG. 4. By combining capacitors C407 and C408 within the same package, the effects of dielectric 503 changing in response to voltage changes across capacitors C407 and C408 may be mitigated, as will be described below.

Conductor 501 may be substantially similar to conductor 301 in FIG. 3. In various embodiments, conductor 501 may have more or fewer plates than conductor 301 and the plates may have a similar or different shape. Conductor 502 may be similar to conductor 302 in FIG. 3. However, conductor 502 may have fewer plates relative to conductor 501. Conductor 505 may be similar to conductor 502 in composition and construction. Conductor 505 may have the same number of plates as conductor 502, or conductor 505 may have more or fewer plates than conductor 502. In some embodiments, the number of plates of conductors 502 and 505 together may equal the number of plates of conductor 501. In other embodiments, conductors 502 and 505 together may have more or fewer plates than conductor 501. In the illustrations of FIG. 5, conductor 505 is drawn such that it may appear that conductors 505 and 502 intersect. However, no conductive path may be established between conductors 502 and 505 within capacitor 500.

Plates from conductor 502 and conductor 505 are interspersed between plates from conductor 501 such that a pattern develops. This pattern starts with a plate from conductor 502 at the top, followed by a plate from conductor 501, then a plate from conductor 505, then a plate from conductor 501. The pattern then repeats: 502-501-505-501-502 and so on. This pattern is just one of many possible ways of interspersing the plates of the three conductors. For example, another suitable arrangement may be 501-505-501-505-501-502-501-502 and then repeat. In some embodiments, having a repeating pattern may not be as critical as maintaining a mix of the plates from conductor 502 and conductor 505. It is noted, however, that a plate from conductor 502 is not adjacent to a plate from conductor 505 as this may create a third capacitor between supply voltage 506 and ground. In other embodiments, however, this may be desired and will be discussed in more detail later in the document.

As was described above in regards to FIG. 3, the dielectric may be a reasonably uniform thickness between the plates of conductors 501 and 502, and between the plates of conductors 501 and 505 when the voltage level of voltage 504 is stable. FIG. 5(A) shows capacitor 500 at the nominal operating voltage. Assuming supply voltage 506 remains stable, if the voltage level of voltage (V−ΔV) 504 drops by a value of ΔV, dielectric 503 may shrink between conductor 501 and conductor 502 as described above in relation to FIG. 3. However, dielectric 503 may expand between conductor 501 and conductor 505 since, as described in reference to FIG. 4, C408 sees a ΔV that may be equal yet opposite of the ΔV seen by C407. If the plates of the three conductors and dielectric 503 are arranged suitably, the overall shape of capacitor may not change significantly, as shown in FIG. 5(B).

If the voltage level of voltage (V+ΔV) 504 increases, rather than drops, by a value of ΔV, dielectric 503 may expand and contract in an opposite manner from what was just described. As shown in FIG. 5(C), the overall shape of capacitor 500 again may not change significantly since the expansion of dielectric 503 between plates of conductors 501 and 502 may cancel out the contraction of dielectric 503 between plates of conductors 501 and 505.

In the embodiment of FIG. 5, dielectric 503 is shown to shrink in response to a negative voltage level shift and expand in response to a positive voltage level shift. As was stated in regards to FIG. 3, the dielectric 503 may, in other embodiments, shrink in response to a positive voltage level shift and expand in response to a negative voltage level shift. In either embodiment, a suitable arrangement of the three conductors and dielectric material may still result in a reduction of the change in shape of capacitor 500.

The embodiment of FIG. 5 also shows a single dielectric, dielectric 503. In other embodiments, a different dielectric material may be used between different layers of conductive plates. For example, a first dielectric material that shrinks in response to a negative voltage level shift may be used between some layers of the conductive plates. Another dielectric material that expands in response to a negative voltage level shift may be used between some layers of the conductive plates. In addition to have differing physical characteristics, the various dielectric materials described above may also have different electrical characteristics, such as, permittivity, for example.

In some embodiments, stacking may include interspersing all plates from conductor 502 with plates from conductor 501 followed by interspersing all plates from conductor 505 with plates from conductor 501, such that no plate of conductor 502 is between two plates of conductor 505 and vice versa. While this arrangement may maintain an overall shape of capacitor 500, the center of mass may still undergo a shift within the package which may still result in a physical force transferred to the circuit board. Above, it was noted that, in some embodiments, having a repeating pattern among the plates of the three conductors may not be as critical as maintaining a mix of the plates from conductor 502 and conductor 505. The purpose of distributing plates of conductor 502 among plates of conductor 505 may be to distribute the shifts of mass within the package of capacitor 500 such that the resulting physical forces generated may be reduced.

It is noted that the illustrations of FIG. 5 are for demonstrative purposes only. The illustrations have been simplified and exaggerated to emphasize the effects of voltage transitions on the shape of an MLCC. In addition, the number of plates shown for each conductor may be different in various embodiments of MLCCs.

Figure 6:
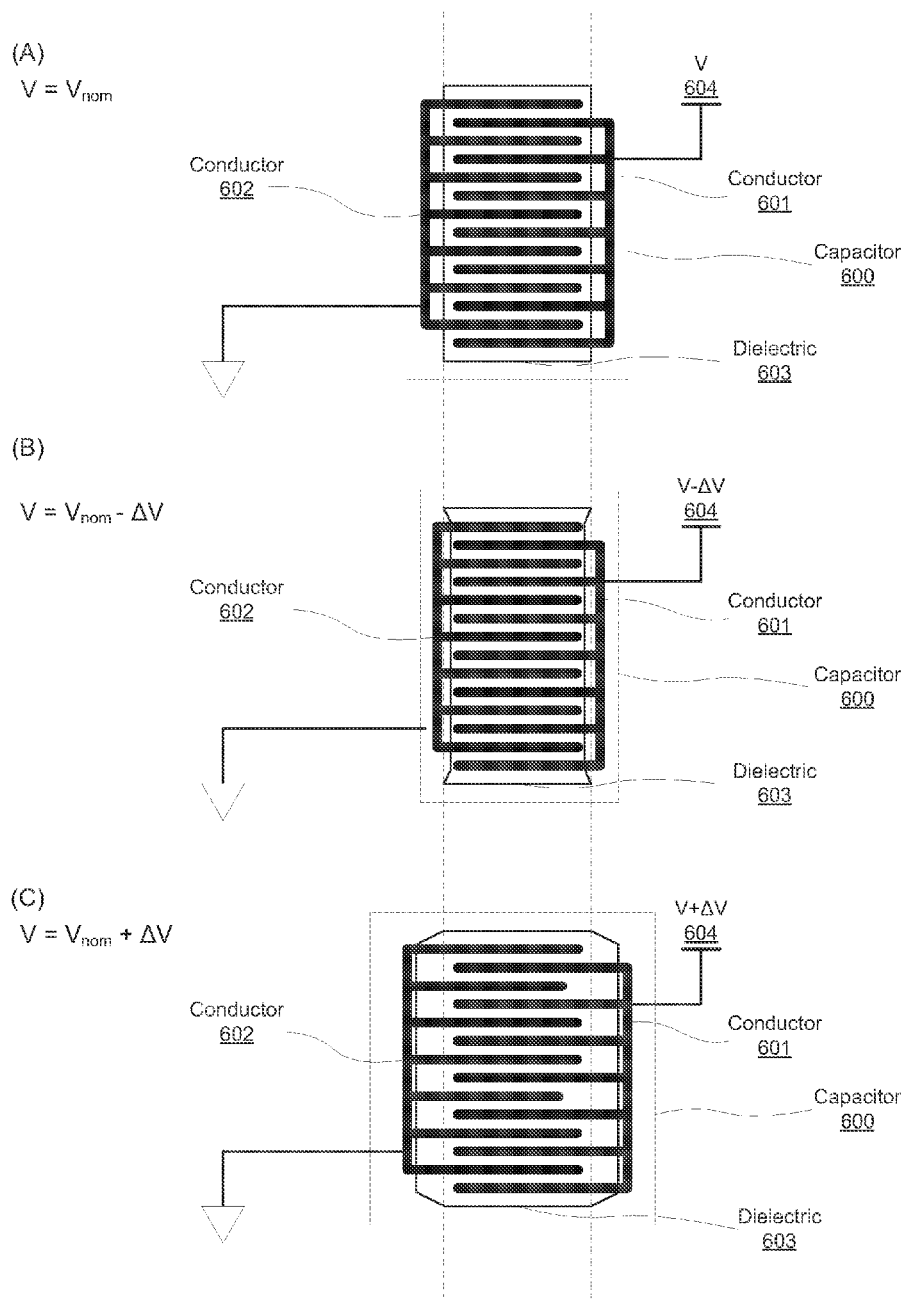
FIG. 6, which includes

FIG. 3 and FIG. 5 demonstrate the effect of dielectric expansion and contraction perpendicular to the planes of the plates of the conductors. FIG. 6, which includes FIGS. 6(A), 6(B), and 6(C), illustrates how the dielectric material may also expand and contract parallel to the plates. FIG. 6 includes three illustrations of capacitor 600, with a similar structure as capacitor 300 in FIG. 3. The three illustrations in FIG. 6 show capacitor 600 (A) with a nominal voltage level of voltage (V) 604, (B) with a sudden drop in voltage level of voltage (V−ΔV) 604 by ΔV and (C) with a sudden increase in voltage level of voltage (V+ΔV) 604 by ΔV. In these three illustrations of FIG. 6, only the parallel effects are shown. The perpendicular effects discussed above are not illustrated.

In FIG. 6(A), capacitor 600 may see a nominal voltage level of voltage 604 and dielectric 603 may be in its baseline shape. In FIG. 6(B), the voltage level of voltage 604 may drop by ΔV. Responsive to the voltage level drop, dielectric 603 may shrink parallel to the plates of conductor 601 and conductor 602. In FIG. 6(C), the voltage level of voltage 604 may increase, instead of dropping, by ΔV. As a result, dielectric 603 may grow parallel to the plates of the conductors. As has been previously disclosed, the shape changes of dielectric 603 may result in a transfer of vibrations to the circuit board which could be audible if corresponding voltage level changes occur at an audible frequency.

The illustrations of FIG. 6 are merely for demonstration. Portions of the illustrations have been simplified, and other portions exaggerated to emphasize the effects of voltage transitions on the shape of an MLCC. In various embodiments, the number of plates and relative proportions shown in the figure may differ from the illustrations in an actual MLCC.

Figure 7:
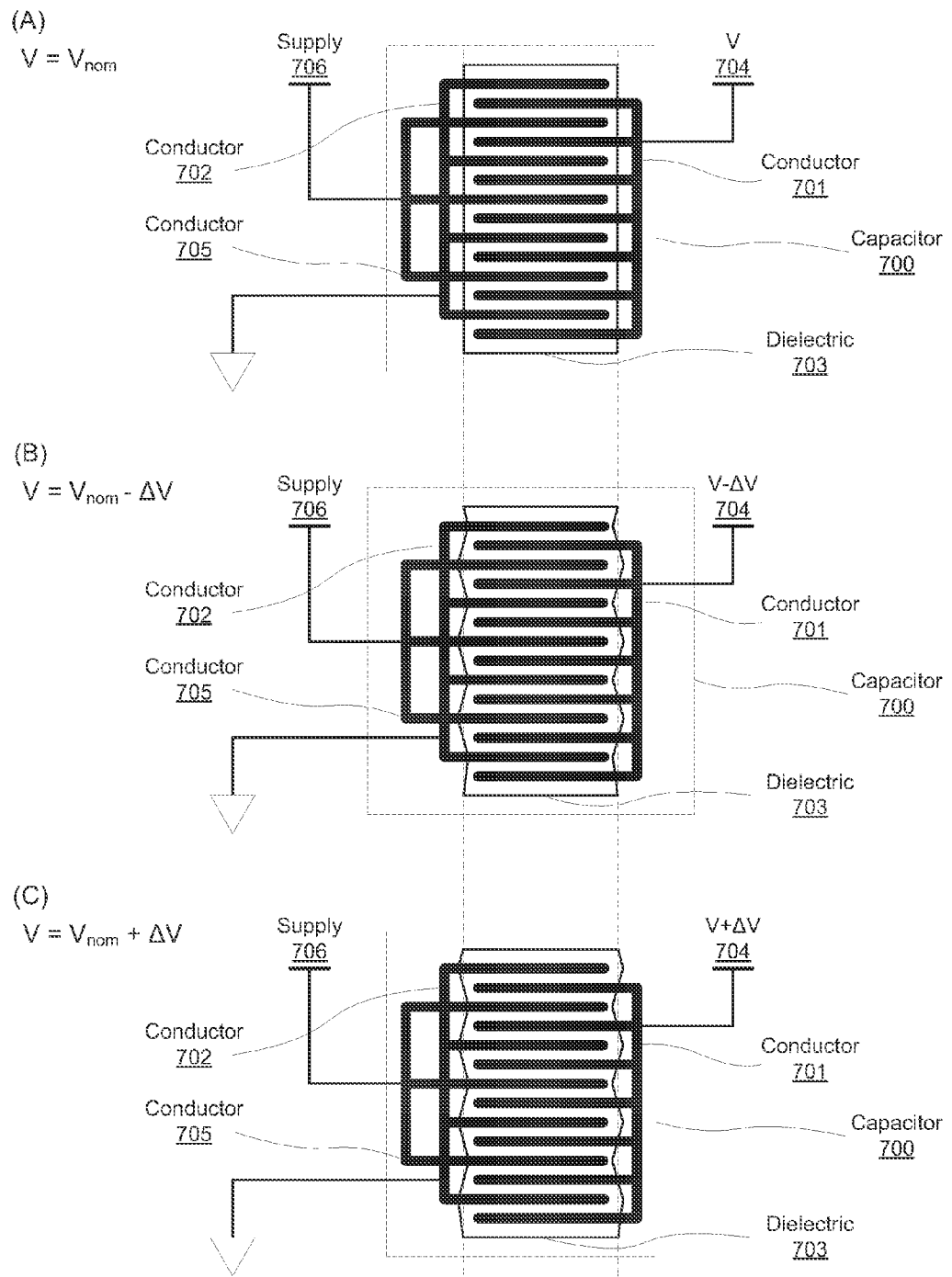
FIG. 7, which includes

Turning to FIG. 7, an embodiment of a MLCC structure similar to the one depicted in FIG. 5 is illustrated. FIG. 7 includes three illustrations, FIGS. 7(A), 7(B), and 7(C), showing capacitor 700 (A) with a nominal voltage level of voltage (V) 704, (B) with a sudden drop in voltage level of voltage (V−ΔV) 704 by ΔV and (C) with a sudden increase in voltage level of voltage (V+ΔV) 704 by ΔV. Again, for ease of understanding, only the parallel effects are shown.

FIG. 7(A) shows dielectric 703 with a baseline shape while experiencing the nominal voltage level on voltage 704. If the voltage level of voltage 704 drops by ΔV as shown in FIG. 7 (B), then dielectric 703 may shrink parallel to the plane of the plates around the plates of conductor 702. However, around the plates of conductor 705, dielectric 703 may expand. This combination of expansion and shrinking may result in a somewhat "zig-zagged" edge of dielectric 703, but the overall shape change may be minimal compared to capacitor 600 in FIG. 6 under the same conditions. A similar effect may be shown in FIG. 7(C) in which the voltage level of voltage 704 increases by ΔV instead of dropping. In this case, dielectric 703 may expand parallel to the plane of the plates around the plates of conductor 702 and shrink around the plates of conductor 705. This may result in a similar, but reversed zig-zagged edge of dielectric 703.

The illustrations shown in FIG. 7 are merely examples to convey a concept. The illustrations have been simplified and exaggerated to emphasize the effects of voltage transitions on the shape of an MLCC. In various embodiments, the number of plates and relative proportions shown in the figure may differ in an actual MLCC.

Method for Decoupling Voltage Transients

Figure 8:
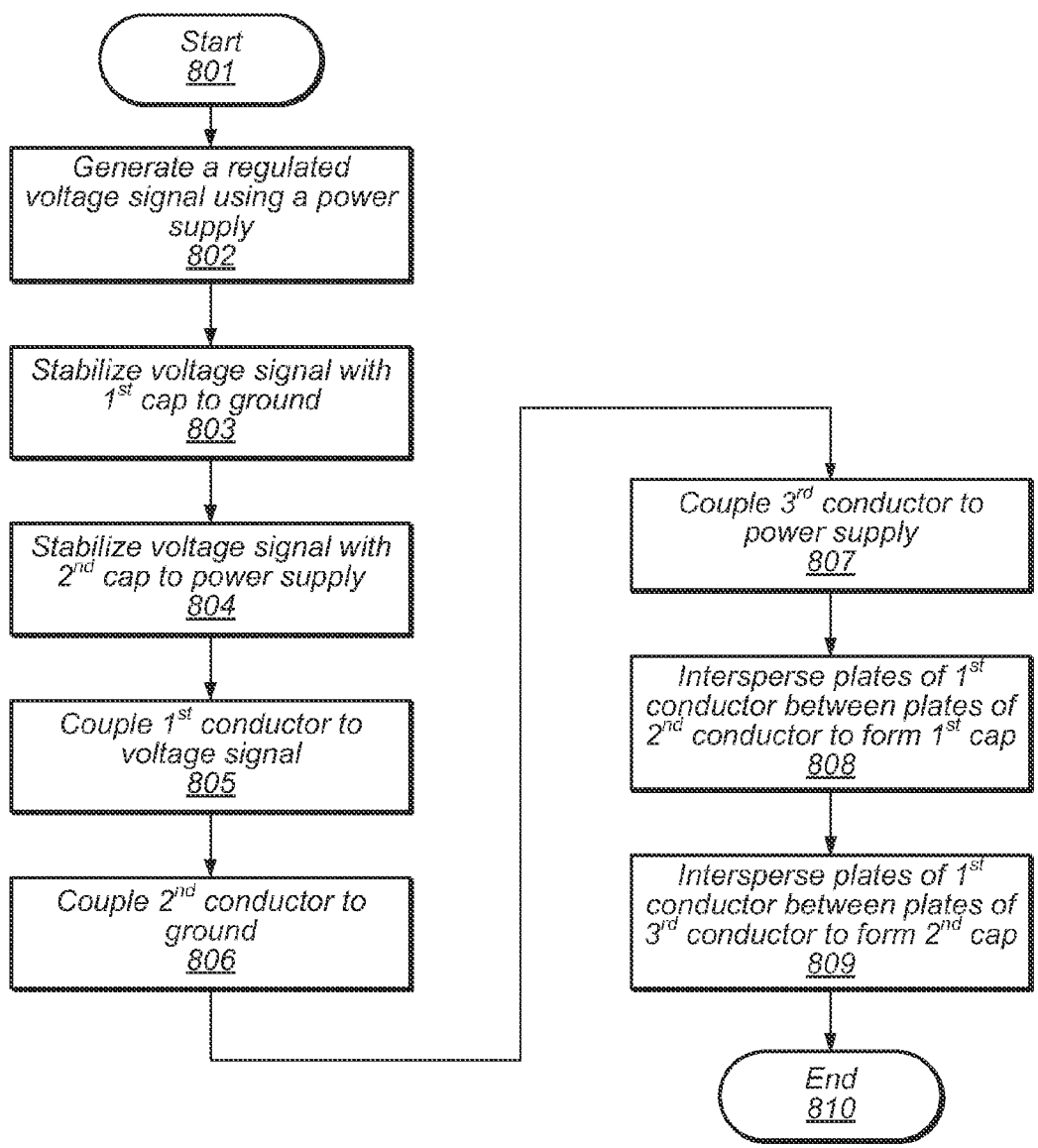
FIG. 8 illustrates a flowchart of an embodiment of a method for decoupling voltage transients from an SoC.

Turning now to FIG. 8, a flowchart for a method of decoupling voltage transients is presented. The method may correspond to system 400 shown in FIG. 4 and to capacitor 500 in FIG. 5. Referring collectively to FIG. 4, FIG. 5, and FIG. 8, the method may begin in block 801.

A regulated voltage may be generated, for example, by voltage regulator 401 (block 802). Voltage regulator 401 may receive supply voltage 402 as an input and output the regulated voltage, VREG output 403. Voltage regulator 401 and or a circuit board on which system 400 is built may include a parasitic inductance, such as, e.g., inductance L405, which may cause voltage fluctuations in response to a change in the current consumption by SoC 404.

To reduce variation in a voltage level of VREG output 403, i.e., stabilize the voltage level of VREG output 403, a first capacitor, such as, e.g., C407, may be coupled from VREG output 403 to ground (block 803). This capacitor may store excess charge from voltage regulator 401 in response to a sudden rise in the voltage level of VREG output 403. In addition, C407 may supply stored charge to SoC 404 in response to a sudden decrease in the voltage level of VREG output 403. In other embodiments, the first capacitor may be coupled to a signal other than ground. Any signal with a stable voltage level that is less than the minimum operating voltage level of VREG output 403 may be suitable.

To further stabilize VREG output 403, a second capacitor, such as, for example, C408, may be coupled from VREG output 403 to supply voltage 402 (block 804). This capacitor may store excess charge from voltage regulator 401 in response to a sudden drop in the voltage level of VREG output 403. In addition, C408 may supply stored charge to SoC 404 in response to a sudden increase in the voltage level of VREG output 403. In other embodiments, the second capacitor may be coupled to a signal other than supply voltage 402. Any signal with a stable voltage level that is greater than the maximum operating voltage level of VREG output 403 may be suitable.

A first conductor for the capacitors may be coupled to VREG output 403 (block 805). This first conductor may correspond to conductor 501 in FIG. 5. The first conductor may consist of multiple plates of a conductive material arranged in parallel and spaced apart from each other. The multiple plates may be coupled together on a common side.

As a further component of capacitor C407, a second conductor may be coupled to ground (block 806). This second conductor may correspond to conductor 502. The second conductor may consist of multiple plates of a conductive material arranged similar to the first conductor. In some embodiments, the second conductor may have fewer plates than the first conductor.

A third conductor, for capacitor C408, may be coupled to a supply voltage, such as, e.g., supply voltage 402 (block 807). This third conductor may correspond to conductor 505. The third conductor may be constructed similar to the second conductor, with multiple plates arranged in parallel and coupled together on a common side.

A next step in the method may be to intersperse the plates of the second conductor throughout the plates of the first conductor (block 808). By interspersing, the plates of the second conductor may be arranged in parallel with the plates of the first conductor, such that most, if not all, plates of the second conductor are near at least one plate of the first conductor. No part of the first conductor may come into contact with any part of the second conductor. A small uniform gap may be maintained between each plate of the first and second conductors. The small uniform gap may be filled with a suitable dielectric material, such as, for example, a ceramic compound.

The method may now intersperse the plates of the third conductor throughout remaining plates of the first conductor (block 809). The plates of the third conductor may be arranged in parallel with the plates of the first conductor such that some or all of the plates of the third conductor are near at least one plate of the first conductor. As with the second conductor, a small uniform gap may be maintained between each plate of the first and third conductors, which may be filled with a similar dielectric material. No part of the third conductor may come into contact with any part of the first or second conductors.

The interspersing of the plates of the second conductor and the third conductor throughout the plates of the first conductor may be performed such that no plate of the second conductor is near a plate of the third conductor without a plate of the first conductor between the two. The interspersing of the plates may also result in a pattern in which at least some of the plates of the second conductor are between at least some of the plates of the third conductor, with plates of the first conductor between any pair of plates of the second and third conductors. For example, with '1' representing a plate of the first conductor, '2' representing a plate of the second conductor and '3' representing a plate of the third conductor, suitable patterns may be: 1-2-1-3-1-2-1-3-1 or 2-1-3-1-3-1-2-1-2-1. Another suitable pattern that may be employed in some embodiments is: 1-2-1-1-3-1-1-2-1-1-3-1, in which case a suitable insulating material other than the previously mentioned dielectric material may be used between the repeating 1-1 layers. A suitable insulating material may be thinner than the dielectric material or may be more pliant than the dielectric and therefore capable of absorbing some of the forces generated by the shrinking and expanding of the dielectric. The interspersing pattern may or may not repeat. The method may end in block 810.

It is noted that MLCCs have been used as examples of capacitors that exhibit shape morphing when exposed to changing voltage levels. However, the features disclosed in this document are not intended to be limited to MLCC technology. The features expressed herein may be applied to any capacitor technology in which each conductor may consist of more than one plate and in which the conductors or dielectric may experience shape morphing in response to a changing voltage level.

The method of FIG. 8 is merely an example. In some embodiments, the number of steps may differ and/or may occur in a different order. Although the steps are shown to occur in a serial sequence, some steps may be performed in parallel.

In the discussions above in reference to FIG. 5, it was noted that if plates of conductor 502 were adjacent to plates of conductor 505, an additional third capacitor may be formed, that may, in some embodiments, provide additional stability to the voltage level on a power supply.

Figure 9:
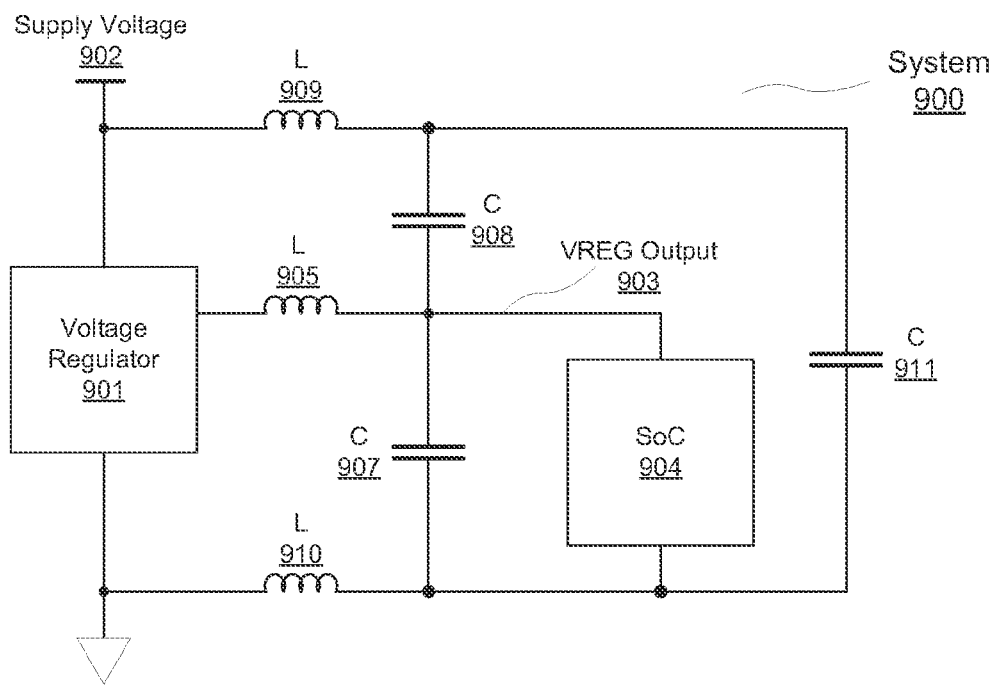
FIG. 9 illustrates another embodiment of a circuit including a voltage regulator and an SoC.

Moving now to FIG. 9, system 900 is illustrated. System 900 may include similar components to system 400, such as, voltage regulator 901 coupled to a supply voltage 902. VREG output 903 may be the output generated by voltage regulator 901 and which may be provided to SoC 904. In some embodiments, the coupling between voltage regulator 901 and SoC 904 may include parasitic inductance L905. Capacitor C907 may decouple VREG output 903 with respect to ground and capacitor C908 may decouple VREG output 903 with respect to supply voltage 902. Parasitic inductance L909 may be included between supply voltage 902 and C908. Parasitic inductance L910 may be included between ground and C907. Capacitor C911 may decouple supply voltage 902 with respect to ground.

Voltage regulator 901, supply voltage 902, VREG output 903, SoC 904, inductance L905, capacitors C907 and C908 may all be similar to voltage regulator 401, supply voltage 402, VREG output 403, SoC 404, inductance L405, capacitors C407 and C408 from FIG. 4, and may therefore behave as described above in reference to FIG. 4.

System 900 includes additional components that may not be referenced in system 400, including inductances L909 and L910. In some embodiments, inductances L909 and L910 may be parasitic inductances. Inductance L909 may include parasitic inductance in supply voltage 902 as well as from conductive traces of supply voltage 902 on a circuit board, on which system 900 is built. Inductance L910 may include parasitic inductance of conductive traces on the circuit board leading to ground. The addition of inductances L909 and L910 may create additional voltage transients on the supply voltage 902 and ground traces as the load placed on supply voltage 902 changes due to current consumption changes by voltage regulator 901 or any other circuit that may be coupled to supply voltage 902, but not shown.

To compensate for the additional parasitic effects of L909 and L910, a third capacitor, C911, may be coupled from supply voltage 902 to ground. Similar to the other decoupling capacitors described herein, C911 may store charge in response to a sudden increase in the voltage level of the traces to supply voltage 902 and may supply charge in response to a sudden decrease in the voltage level of the traces to supply voltage 902. The opposite may be true with respect to the traces to ground. A drop in the voltage level of the traces to ground may result in C911 storing charge and an increase in the voltage level of the traces to ground may result in C911 supplying charge.

The block diagram of FIG. 9 has been simplified for demonstrating the concepts discussed above. System 900 in FIG. 9 shows only the components necessary for demonstration of the embodiments herein. In other embodiments, system 900 may include various other components not shown in FIG. 9.

Figure 10:
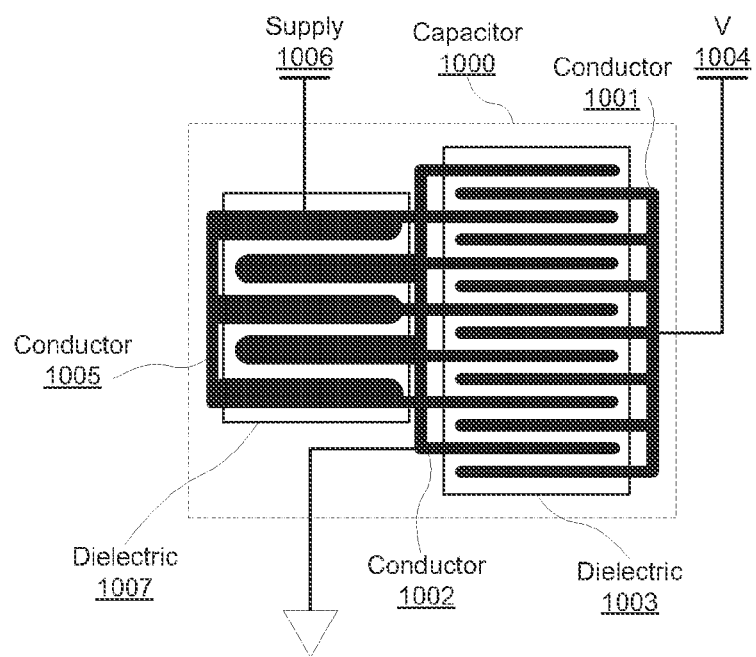
FIG. 10 illustrates an embodiment of a multi-layer capacitive network including three capacitors.

Turning to FIG. 10, an embodiment of another capacitor, such as, for example, an MLCC, is illustrated. Capacitor 1000 includes conductor 1001, coupled to voltage (V) 1004, and conductor 1002 coupled to ground. Conductor 1001 and conductor 1002 may be isolated from each other by dielectric 1003. Capacitor 1000 also includes conductor 1005 coupled to supply voltage (Supply) 1006. Dielectric 1007 may be used to separate plates of conductor 1002 from plates of conductor 1005.

Capacitor 1000 may be similar to capacitor 500 in FIG. 5 with regards to the construction of capacitors between conductors 1001 and 1002 and between conductors 1001 and 1005. The capacitor formed by plates of conductors 1001 and 1002 may correspond to C907 in FIG. 9. Likewise, the capacitor formed by the conductors 1001 and 1005 may correspond to C908 in FIG. 9. In the illustrations of FIG. 10, conductor 1005 is drawn such that it may appear that conductors 1005 and 1002 intersect. As stated for capacitor 500, however, no conductive path may be established between conductors 1002 and 1005 within capacitor 1000.

Capacitor 1000 may differ from capacitor 500 in that capacitor 1000 may have plates of conductor 1002 parallel and near to plates of conductor 1005 and separated by dielectric 1007. Dielectric 1007 may be a part of dielectric 1003 or dielectric 1007 may be separate from dielectric 1003. The plates of conductor 1002 parallel and near to the plates of conductor 1005 may form a third capacitor, between supply voltage 1006 and ground. This third capacitor may correspond to C911 in FIG. 9.

It is noted that the illustrations of FIG. 10 are for demonstrative purposes only. The illustrations have been simplified and exaggerated to emphasize the effects of voltage transitions on the shape of a multi-layer capacitor. In addition, the number of plates shown for each conductor may be far greater in a physical embodiment.

Method for Decoupling a Supply Voltage

Figure 11:
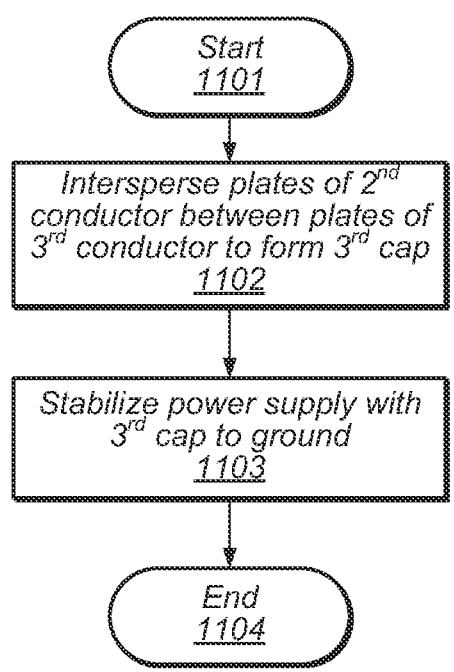
FIG. 11 illustrates a flowchart of an embodiment of a method for decoupling voltage transients from a supply voltage.

Moving to FIG. 11, a flowchart for a method of decoupling a supply voltage is presented. The method may correspond to system 900 shown in FIG. 9 and to capacitor 1000 in FIG. 10. Referring collectively to FIG. 9, FIG. 10, and FIG. 11, the method may continue after step 809 in the method of FIG. 8, beginning in block 1101.

A third capacitor may be formed by interspersing plates from a conductor that has been coupled to ground, such as conductor 1002, with plates from a conductor that has been coupled to supply voltage 902, such as conductor 1005 (block 1102). The plates of conductor 1002 may be arranged in parallel with the plates of conductor 1005 such that at least one plate of conductor 1002 is parallel and near to at least one plate of conductor 1005. A small uniform gap may be maintained between each plate of conductors 1002 and 1005, which may be filled with a suitable dielectric material. In some embodiments, the arrangement of capacitor plates as described in relation to FIG. 11 may reduce the deformation of dielectric material in a capacitor as has been previously described, thereby possibly eliminating audible noise associated with capacitor "singing."

To stabilize a supply voltage, such as, for example, supply voltage 902, the third capacitor may be coupled from supply voltage 902 to ground as illustrated by C911 in FIG. 9 (block 1103). This third capacitor may store excess charge in response to a sudden rise in the voltage level of traces on a circuit board coupled to supply voltage 902. In addition, the third capacitor may supply stored charge in response to a sudden decrease in the voltage level of traces on a circuit board coupled to supply voltage 902. In other embodiments, the third capacitor may be coupled to signals other than supply voltage 902 and ground, and may depend on how capacitors C907 and C908 are coupled into system 900.

It is noted that the method of FIG. 11 is merely an example. In some embodiments, the number of steps may differ and/or may occur in a different order. Although the steps are shown to occur in a serial sequence, steps may be performed in parallel.

Numerous variations and modifications will become apparent to those skilled in the art once the above disclosure is fully appreciated. It is intended that the following claims be interpreted to embrace all such variations and modifications.

What is claimed:

1. A device, comprising:
   a first plurality of conductive plates coupled to a first node in a common package;
   a second plurality of conductive plates coupled to a second node in the common package; and
   a third plurality of conductive plates coupled to a third node in the common package;
   wherein at least a first conductive plate of the first plurality of conductive plates is arranged between at least a first conductive plate of the second plurality of conductive plates and at least a first conductive plate of the third plurality of conductive plates;
   wherein at least a second conductive plate of the second plurality of conductive plates is arranged adjacent to at least a second conductive plate of the third plurality of conductive plates;
   wherein a first capacitor is formed between the first node and the second node, a second capacitor is formed between the first node and the third node, and a third capacitor is formed between the second node and the third node; and
   wherein at least one common conductive plate of the first plurality of conductive plates is included in the first capacitor and the second capacitor.

2. The device of claim 1, wherein at least a second conductive plate of the first plurality of conductive plates is arranged between at least two conductive plates of the second plurality of conductive plates, and wherein at least a third conductive plate of the first plurality of conductive plates is arranged between at least two conductive plates of the third plurality of conductive plates.

3. The device of claim 1, wherein a first space between the at least first conductive plate of the first plurality of conductive plates and the at least first conductive plate of the second plurality of conductive plates includes a dielectric material, and wherein a second space between the at least first conductive plate of the first plurality of conductive plates and the at least first conductive plate of the third plurality of conductive plates includes the dielectric material.

4. The device of claim 3, wherein the dielectric material is configured to shrink responsive to a negative voltage level and expand responsive to a positive voltage level change.

5. The device of claim 3, wherein the dielectric material is configured to shrink responsive to a positive voltage level change and expand responsive to a negative voltage level change.

6. A system, comprising:
   a power supply configured to provide a first voltage level between a positive terminal and a negative terminal;
   a voltage regulator coupled to the power supply, wherein the voltage regulator is configured to generate a second voltage level at an output terminal, wherein the second voltage level is dependent upon the first voltage level;
   a first capacitor coupled between the output terminal and the negative terminal, wherein the first capacitor includes a first subset of a first plurality of conductive plates coupled to the output terminal and a first subset of a second plurality of conductive plates coupled to the negative terminal;
   a second capacitor coupled between the output terminal and the positive terminal, wherein the second capacitor includes a second subset of the first plurality of conductive plates coupled to the output terminal and a first subset of a third plurality of conductive plates coupled to the positive terminal; and
   a third capacitor coupled between the positive terminal and the negative terminal, wherein the third capacitor includes a second subset of the second plurality of conductive plates coupled to the negative terminal and a second subset of the third plurality of conductive plates coupled to the positive terminal, and wherein at least one plate of the second subset of the second plurality is between two plates of the second subset of the third plurality;
   wherein at least one conductive plate of the first plurality of conductive plates is arranged between at least one conductive plate of the second plurality of conductive plates and at least one conductive plate of the third plurality of conductive plates; and
   wherein the first subset of the first plurality of conductive plates and the second subset of the first plurality of conductive plates each include at least one common conductive plate of the first plurality of conductive plates.

7. The system of claim 6, wherein a common package includes a first node coupled to the output terminal, a second node coupled to the negative terminal and a third node coupled to the positive terminal.

8. The system of claim 7, wherein the first node is coupled to the first plurality of conductive plates and wherein the second node is coupled to the second plurality of conductive plates, and wherein the third node is coupled to the third plurality of conductive plates.

9. The system of claim 6, wherein the first subset of the first plurality of conductive plates is separated from the first subset of the second plurality of conductive plates by a dielectric material and wherein the second subset of the first plurality of conductive plates is separated from the first subset of the third plurality of conductive plates by the dielectric material.

10. The system of claim 9, wherein the dielectric material includes a ceramic material.

11. The system of claim 6, wherein the second subset of the third plurality of conductive plates is separated from the second subset of the second plurality of conductive plates by a dielectric material.

12. A method comprising:
    generating an output voltage signal at a first voltage level dependent upon an input voltage signal at a second voltage level;
    stabilizing the output voltage signal by coupling a first capacitor between the output voltage signal and a ground reference, wherein the first capacitor includes a first subset of a first plurality of conductive plates coupled to the output voltage signal and a first subset of a second plurality of conductive plates coupled to the ground reference and at least one conductive plate of the first plurality of conductive plates is adjacent to at least one conductive plate of the second plurality of conductive plates; and stabilizing the output voltage signal by coupling a second capacitor between the output voltage signal and the input voltage signal, wherein the second capacitor includes a second subset of the first plurality of conductive plates coupled to the output voltage signal and a first subset of a third plurality of conductive plates coupled to the input voltage signal, at least another conductive plate of the first plurality of conductive plates is adjacent to at least one conductive plate of the third plurality of conductive plates, and a dielectric material is disposed between at least one conductive plate of the first subset of the first plurality of conductive plates and an adjacent conductive plate of the first subset of the second plurality of conductive plates;

wherein the dielectric material includes at least a first dielectric material configured to shrink responsive to a negative voltage level change and expand responsive to a positive voltage level change, and a second dielectric material configured to shrink responsive to a positive voltage level change and expand responsive to a negative voltage level change.

13. The method of claim 12, further comprising stabilizing the input voltage signal by coupling a third capacitor between the input voltage signal and the ground reference, wherein the third capacitor includes a second subset of the second plurality of conductive plates coupled to the ground reference and a second subset of the third plurality of conductive plates coupled to the input voltage signal.

14. The method of claim 12, wherein the output voltage signal is coupled to a first node in a common package, the ground reference is coupled to a second node in the common package, and the input voltage signal is coupled to a third node in the common package.

15. The method of claim 14, wherein the first node is coupled to the first plurality of conductive plates, the second node is coupled to the second plurality of conductive plates, and the third node is coupled to the third plurality of conductive plates.

16. A device, comprising:
a first plurality of conductive plates coupled to a first node in a common package;
a second plurality of conductive plates coupled to a second node in the common package; and
a third plurality of conductive plates coupled to a third node in the common package;
wherein at least a first conductive plate of the first plurality of conductive plates is arranged between at least a first conductive plate of the second plurality of conductive plates and at least a first conductive plate of the third plurality of conductive plates;
wherein a space between the at least a first conductive plate of the first plurality of conductive plates and the at least a first conductive plate of the second plurality of conductive plates and the at least a first conductive plate of the third plurality of conductive plates includes a dielectric material; and
wherein the dielectric material includes at least a first dielectric material configured to shrink responsive to a negative voltage level change and expand responsive to a positive voltage level change, and a second dielectric material configured to shrink responsive to a positive voltage level change and expand responsive to a negative voltage level change.

17. The device of claim 16, wherein a first capacitor is formed between the first node and the second node and a second capacitor is formed between the first node and the third node; and wherein at least one common conductive plate of the first plurality of conductive plates is included in the first capacitor and the second capacitor.

18. The device of claim 16, wherein at least a second conductive plate of the second plurality of conductive plates is arranged adjacent to at least a second conductive plate of the third plurality of conductive plates.

19. A method comprising:
generating an output voltage signal at a first voltage level dependent upon an input voltage signal at a second voltage level;
stabilizing the output voltage signal by coupling a first capacitor between the output voltage signal and a ground reference, wherein the first capacitor includes a first subset of a first plurality of conductive plates coupled to the output voltage signal and a first subset of a second plurality of conductive plates coupled to the ground reference and at least one conductive plate of the first plurality of conductive plates is adjacent to at least one conductive plate of the second plurality of conductive plates;
stabilizing the output voltage signal by coupling a second capacitor between the output voltage signal and the input voltage signal, wherein the second capacitor includes a second subset of the first plurality of conductive plates coupled to the output voltage signal and a first subset of a third plurality of conductive plates coupled to the input voltage signal, at least another conductive plate of the first plurality of conductive plates is adjacent to at least one conductive plate of the third plurality of conductive plates, and a dielectric material is disposed between at least one conductive plate of the first subset of the first plurality of conductive plates and an adjacent conductive plate of the first subset of the second plurality of conductive plates; and
stabilizing the input voltage signal by coupling a third capacitor between the input voltage signal and the ground reference, wherein the third capacitor includes a second subset of the second plurality of conductive plates coupled to the ground reference and a second subset of the third plurality of conductive plates coupled to the input voltage signal;
wherein the first subset of the first plurality of conductive plates and the second subset of the first plurality of conductive plates each include at least one common conductive plate of the first plurality of conductive plates.

20. The method of claim 19, wherein the third capacitor includes at least one conductive plate of the second subset of the second plurality of conductive plates adjacent to at least one conductive plate of the second subset of the third plurality of conductive plates.

* * * * *